(12) United States Patent
Piikivi

(10) Patent No.: US 7,076,328 B2
(45) Date of Patent: Jul. 11, 2006

(54) AUTOMATIC ARRANGEMENT, MOBILE TERMINAL CONNECTED THEREWITH, AND METHOD OF TRANSFERRING OPERATIONAL DATA OF AUTOMATIC APPARATUS

(75) Inventor: Lauri Piikivi, Oulu (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 10/303,383

(22) Filed: Nov. 25, 2002

(65) Prior Publication Data

US 2003/0104802 A1 Jun. 5, 2003

(30) Foreign Application Priority Data

Nov. 30, 2001 (FI) .................................. 20012343

(51) Int. Cl.
*H04M 11/00* (2006.01)
*H04B 1/38* (2006.01)

(52) U.S. Cl. .................... 700/231; 455/405; 455/412.1; 455/420; 455/556.1; 700/236

(58) Field of Classification Search ............... 455/3.03, 455/41.2, 66.1, 414.1, 412.1, 422.1, 344, 455/405, 418–420, 557–558, 550.1, 554.2, 455/556.1; 700/231, 241, 236, 240, 244
See application file for complete search history.

(56) References Cited

U.S. PATENT DOCUMENTS

| | | | |
|---|---|---|---|
| 5,930,771 A | 7/1999 | Stapp | 705/28 |
| 6,038,491 A * | 3/2000 | McGarry et al. | 700/231 |
| 6,339,731 B1 | 1/2002 | Morris et al. | 700/236 |
| 6,462,644 B1 * | 10/2002 | Howell et al. | 340/5.92 |
| 6,728,532 B1 * | 4/2004 | Ahonen | 455/419 |
| 2001/0046851 A1 * | 11/2001 | Yamaguchi | 455/412 |
| 2002/0128932 A1 * | 9/2002 | Yung et al. | 705/27 |
| 2003/0003865 A1 * | 1/2003 | Defosse et al. | 455/41 |
| 2005/0101270 A1 * | 5/2005 | Whitehead | 455/131 |

* cited by examiner

*Primary Examiner*—Simon Nguyen
(74) *Attorney, Agent, or Firm*—Harrington & Smith, LLP

(57) ABSTRACT

The invention relates to a device arrangement and a method utilizing the device arrangement, by means of which it is possible to simplify the construction of various automatic apparatus (10) as regards equipment associated with the storage and transfer of various data produced by the automatic apparatus. In the device arrangement according to the invention, a wireless terminal (12) is connected with an automatic apparatus (10) and serves both as a communication means and as a local database device (13). From this local database (13) data relating to the automatic apparatus (10) are transferred from time to time to a service provider's central database (16) by means of the wireless terminal (12).

16 Claims, 3 Drawing Sheets

Figure 1:
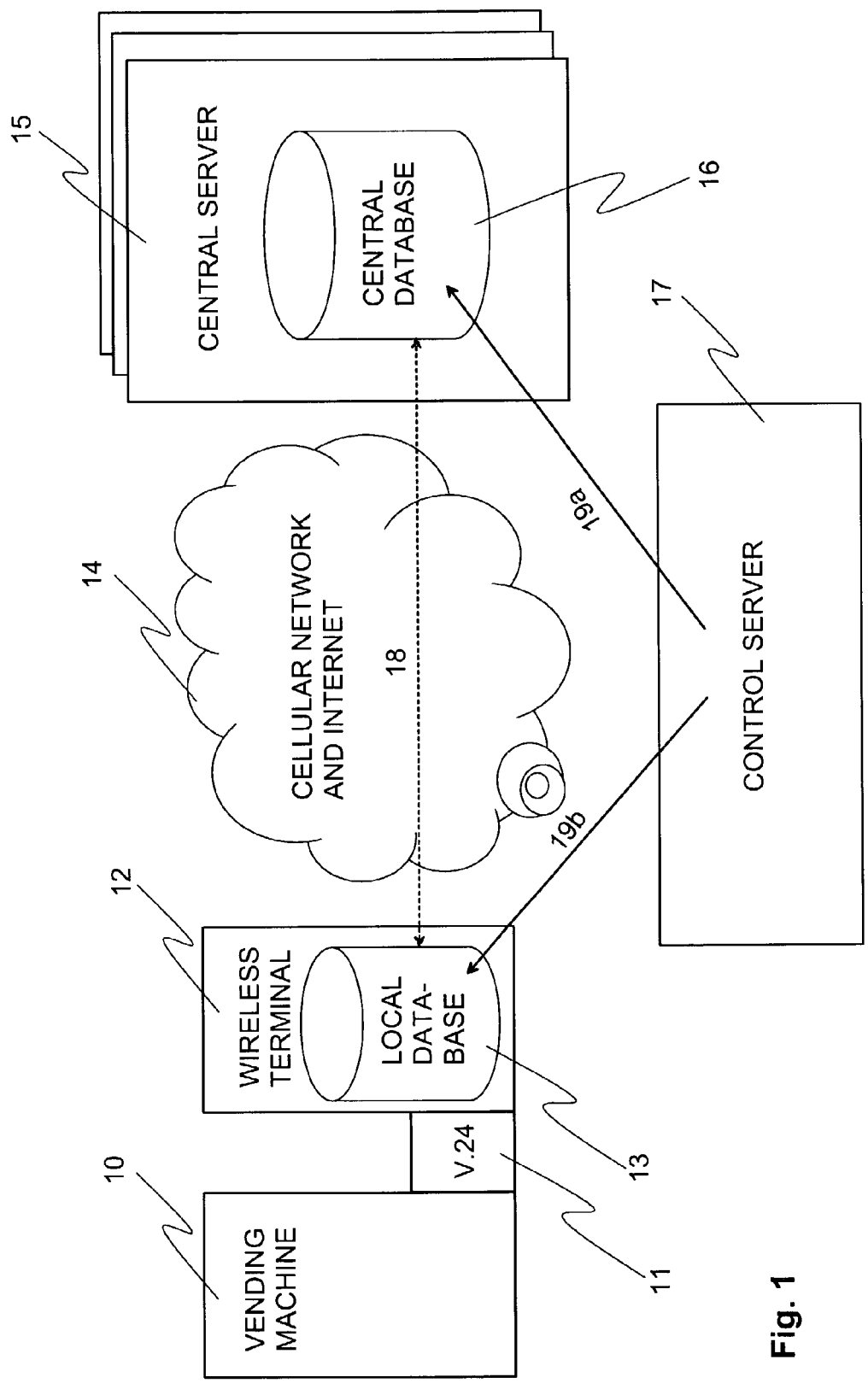

AUTOMATIC ARRANGEMENT, MOBILE TERMINAL CONNECTED THEREWITH, AND METHOD OF TRANSFERRING OPERATIONAL DATA OF AUTOMATIC APPARATUS

The invention relates to a device arrangement for communicating data produced by an automatic apparatus or a machine, said device arrangement comprising an automatic apparatus or a machine, a wireless terminal operational in a cellular network, means for connecting the automatic apparatus or machine with a wireless terminal so that they can exchange messages, a cellular network associated with the wireless terminal, at least one central server connected with the wireless terminal through a cellular network, and a control server connected with the central server and wireless terminal. The invention also relates to a wireless terminal connected with an automatic apparatus or a machine, comprising an antenna, reception means, transmission means, user interface, control unit, and a memory. The invention further relates to a method for communicating data produced by an automatic apparatus or a machine to a central database, said method comprising a step for transferring the data produced by the automatic apparatus to a wireless terminal.

Self service-based purchase of goods or services has dramatically increased in recent years. The purchase event is handled by a vending machine which, while collecting the payment, also delivers the item or service in question. Methods of payment are numerous, including the use of coins and bank notes, various cash or credit cards and increasingly also the use of different mobile terminals.

In the latter two cases the payment data have to be transferred to a database of a financial institution for the final transaction to take place. The transfer of payment data may be either a real-time process or a batch process. Real-time communication between an automatic apparatus and a database of a financial institution will consume resources of the data communication network in question and is rather expensive per transaction. Operation of batch process-based automatic apparatus always requires the configuration and installation of a specifically tailored communication connection on a case by case basis. In both of these cases an attempt to keep the communication connection as simple as possible will usually lead to that means will be installed in the vending machine that only can transfer data to a single predetermined party. In such an arrangement it will be difficult and expensive to make changes in the various communication connection parameters because such changes have to made manually for each vending machine.

Automatic data collection is also utilized in connection with other equipment, machines and meters. Such data-collecting apparatus include e.g. certain elevator equipment in which usage data are stored for maintenance or other such purposes. Also the remote reading of consumer's meters, such as electricity, gas or water meters, requires that the result of a measurement carried out at a certain place is periodically transferred to a central database for billing purposes. Furthermore, measurement data are collected from factory equipment in order to control repair and maintenance functions. At present, such devices/automatic apparatus must be equipped with separate devices to provide the data communication facility needed.

An object of this invention is to provide a new kind of procedure/batch process to transfer data collected by an automatic apparatus or machine to a central database, in which procedure there is no need for installation in the automatic apparatus proper of means to transfer the collected data to a certain database through a data communication network.

The objects of the invention are achieved by a device arrangement in which a terminal of a cellular network is connected to an automatically functioning apparatus, hereinafter automatic apparatus, or a machine, said terminal serving both as a data communication means between the automatic apparatus and a database on a server and as a temporary storage of payment, measurement and other data accumulated in the automatic apparatus, i.e. as a local database server. Transfer of accumulated data from the database on the terminal to a database on a central server is at a later stage carried out in a batch process using a data communication method supported by the terminal. This way, configuration of the automatic apparatus/machine needs not take into account the requirements of the data communication connection proper, and one and the same basic automatic apparatus may be easily utilized in connection with several different data communication networks by just attaching to the automatic apparatus/machine a terminal capable of communicating with the cellular network in question.

A device arrangement according to the invention is characterized in that the memory of a wireless terminal included in the device arrangement is arranged so as to serve as a local database means for an automatic apparatus/machine.

A wireless terminal attached to a device arrangement according to the invention is characterized in that its control unit is arranged so as to use the memory of the terminal as a local database means for an automatic apparatus/machine connected with the wireless terminal.

A method according to the invention is characterized in that it comprises a step for saving data produced by an automatic apparatus/machine to the memory of a wireless terminal serving as a local database, a step for starting data transfer from a wireless terminal to a central database, and a step for transferring said data from the database on the terminal to said central database.

Some advantageous embodiments of the invention are presented in the dependent claims.

The basic idea of the invention is as follows: In a device arrangement according to the invention a terminal of a cellular network is connected in a fixed manner to an automatic apparatus or a machine. From time to time a communication connection is established via the terminal advantageously to a certain central server in association of which there is the main database proper concerning the automatic apparatus/machines. Naturally the device arrangement according to the invention may include several such central servers from different service providers. In addition to this data communication function, the memory of said terminal also serves as a local database device into which data collected by an individual automatic apparatus/machine are saved temporarily, and from which the data are later transferred to a database associated with a central server of a service provider. The wireless terminal is connected in a fixed manner to the automatic apparatus/machine proper. A standard command language is used in the communication between the terminal and automatic apparatus/machine to transfer instructions and data. Contents of certain parts of the local database according to the invention in the wireless terminal may also be changed by instructions from a separate control server according to the invention, which control server belongs to the device arrangement. These instructions may be communicated through a data communication network either direct from the control server to the wireless terminal or via a central server.

An advantage of the invention is that the automatic apparatus/machine only needs to be provided with a command language according to a generally known standard by means of which data can be transferred from the automatic apparatus/machine to a wireless terminal and database means therein. There is thus no need to include in the automatic apparatus/machine any means for establishing a communication connection proper with a central server of a service provider.

Another advantage of the invention is that if the automatic apparatus is a vending machine, the payment data collected by the vending machine can be easily communicated by means of the invention to databases of several financial institutions.

A further advantage of the invention is that functions of an automatic apparatus/machine or a terminal serving as a local database can be re-programmed by a control server according to the invention.

Figure 2:
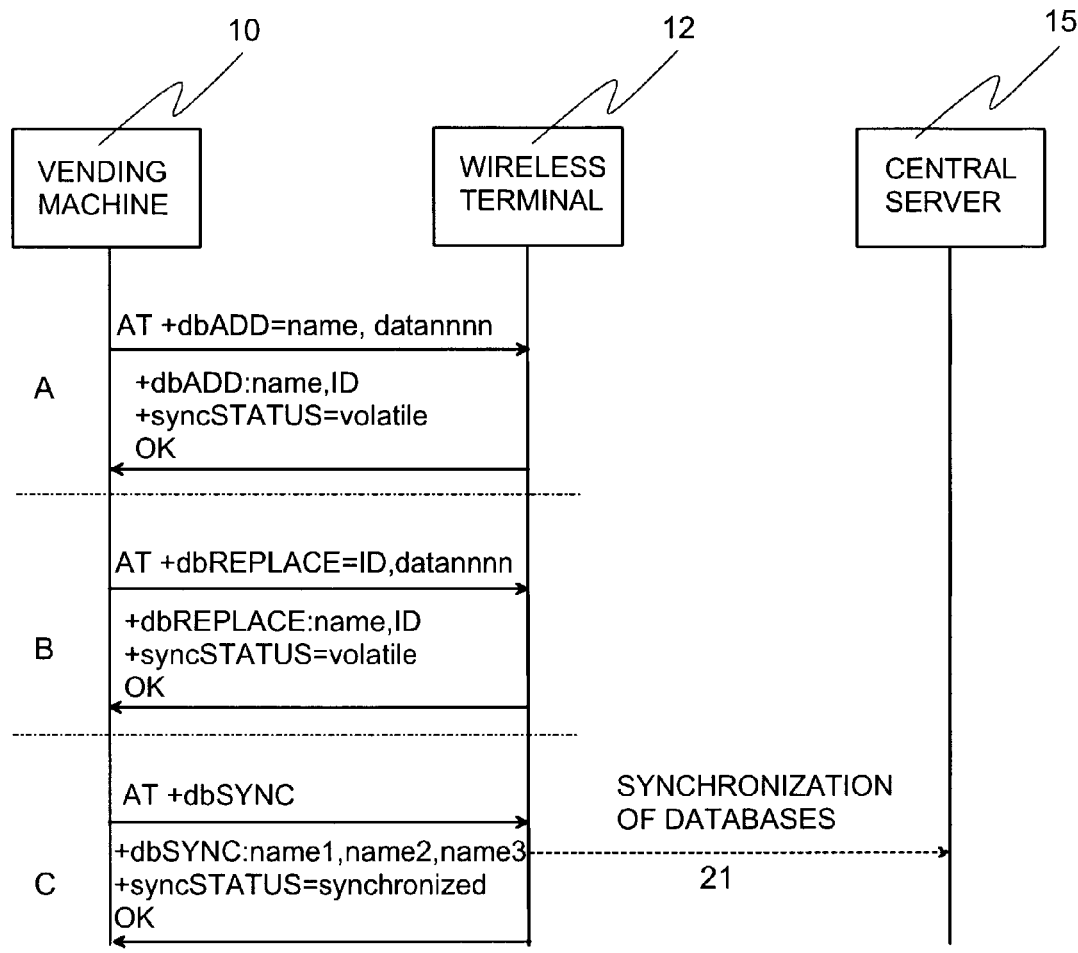
Figure 3:
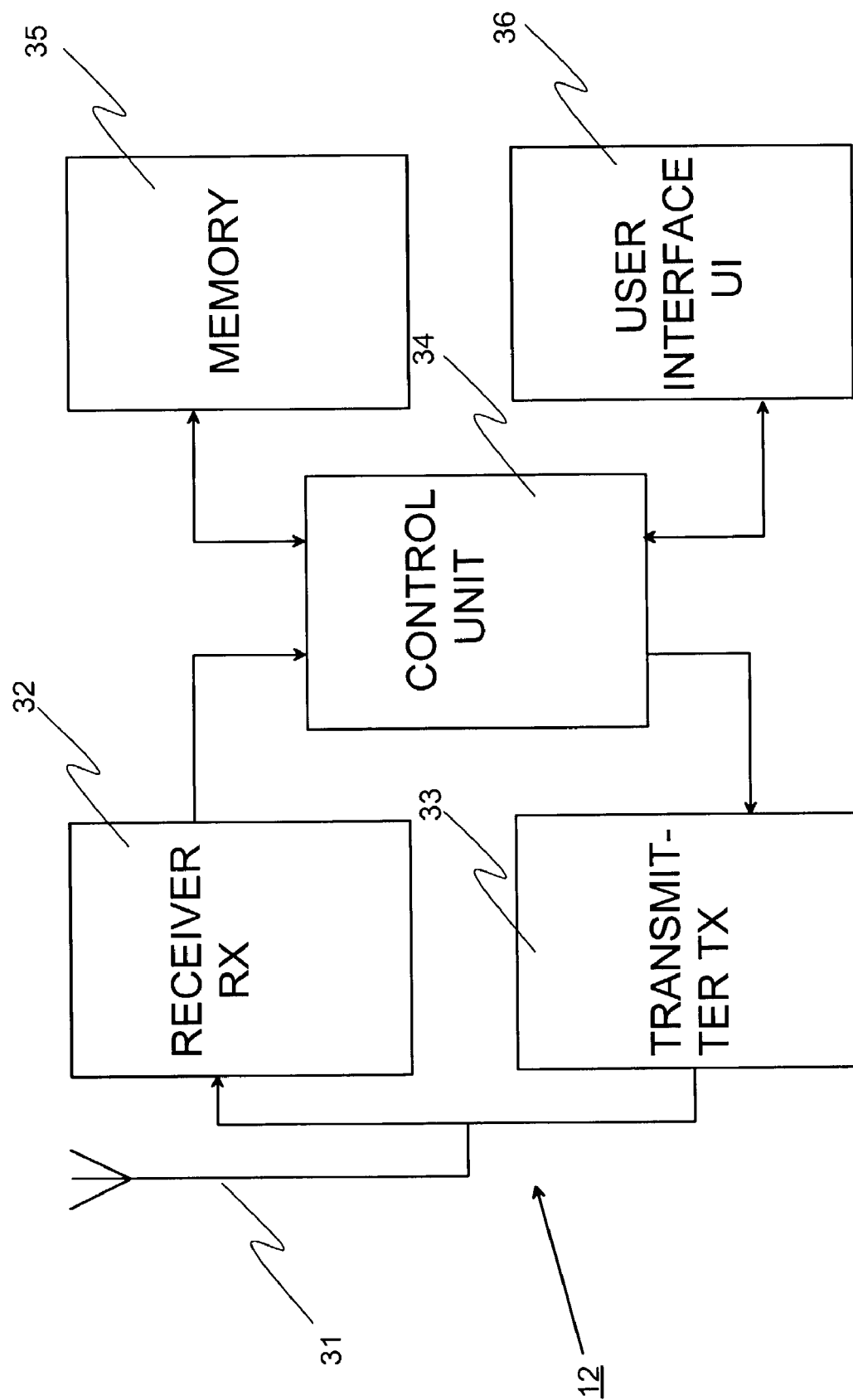

The invention is below described in detail. Reference will be made to the accompanying drawings in which FIG. 1 shows as an example a diagram of an advantageous device arrangement according to the invention, FIG. 2 shows as an example three interactive data communication events A, B and C between a vending machine, wireless terminal and central server, and FIG. 3 shows as an example the main components of a wireless terminal used in the device arrangement according to the invention.

The device arrangement and method according to the invention are described in the following using a vending machine arrangement according to FIGS. 1 to 3 as an example.

FIG. 1 shows as an example a few main components of a device arrangement according to the invention. Reference numeral 10 represents a vending machine or similar automatically functioning apparatus which can be used subject to payment or license. Such automatic apparatus include e.g. cigarette, candy, soft drink and ticket vending machines. It is also possible to automatically charge for various services. Such automatic apparatus are used in parking control, for example. In the device arrangement according to the invention the configuration of the functions of the automatic apparatus only needs to take into account the connecting of the automatic apparatus to a terminal 12 of a cellular network and the means required by the command language needed in this connection interval. The configuration of the automatic apparatus therefore does not need to take into account communication connections proper with the information systems of the financial institution. Connection between the automatic apparatus and wireless terminal is realized using a fixed connection 11. Advantageously said fixed connection is implemented using a serial interface according to the V.24 standard. The physical connection means may comprise a V.24 D9 connector.

The cellular terminal 12 is a device capable of operating in at least one cellular network 14. FIG. 1 shows of the terminal 12 only the memory, in which a local database 13 is created, in which database the payment data produced by the automatic apparatus 10 are stored. Transfer of data/instructions between the automatic apparatus 10 and wireless terminal 12 can be carried out using a standardized command language. Advantageously commands according to the AT (ATtention) command language, known from modems, are used. With this arrangement, considerations for the data communication network 14 proper and its use need not to be accounted for in the configuration of the automatic apparatus 10.

In the transfer of data from the wireless terminal 12 on it is possible to utilize those transfer methods which the terminal 12 supports. The communication connection 18 from the terminal 12 to a central server 15 of a financial institution may comprise several different connection types, such as wireless cellular network, Internet or modem connection in the telephone network. By default, only those methods are used which the terminal is capable of utilizing. The communication connection between the wireless terminal 12 and central server 15 is established when needed and only for the duration of the transfer of the payment data from the local database 13 to the central database 16. Advantageously the connection protocol is either SyncML (Synchronization Markup Language), XML (extensible Markup Language), a data transfer protocol for card payments used by financial institutions, specified by ISO 8583, or the GIOP (General Inter-Orb Protocol) of the COBRA (Common Object Request Broker Architecture). Data transfer from a database to another may be initiated in the following manners. First, the amount of free memory in the wireless terminal 12 goes below a predetermined limit. Data transfer may also be scheduled; it may always occur at a certain hour of the day or it may always start when a certain time has elapsed from the previous transfer of payment data. Data transfer may also be initiated by an instruction from a control server 17 belonging to the device arrangement or by an instruction from the automatic apparatus.

The exemplary, vending machine-based device arrangement according to the invention may comprise several central servers 15 which may be managed by different financial institutions. Each central server 15 has a database 16 where the payment data of the automatic apparatus 10 can be saved. A wireless terminal 12 connected to an automatic apparatus 10 can establish a data communication connection 18 with any one of these central servers 15. Information as to which one of the central servers 15 the wireless terminal shall call, is sent to the wireless terminal 12 by the control server 17 using a separate instruction message which may be either permanent or apply only to a single transfer of payment data.

The control server 17 controls the operation of the device arrangement according to the invention. It is connected to the central servers 15 and their databases 16 through a data communication connection 19a. A direct communication connection 19b may also be established between the control server 17 and the wireless terminal 12. From the control server 17 it is possible to transfer to the wireless terminal 12 software applications needed by the terminal in its operation or individual instructions via either the direct communication connection 19b or a connection 19a established with a central server. Said software applications advantageously comprise specifications indicating to the terminal 12 the connection protocol required for establishing a data communication connection with the automatic apparatus 10 proper. This way, data transfer between the automatic apparatus 10 and terminal 12 can be realized by means of software, using a preferred connection protocol or one that is appropriate for said devices. Likewise it is possible to indicate to the wireless terminal 12 to which one of the central servers 15 it shall transfer the payment data of the automatic apparatus. With a control server 17 according to the invention it is possible to provide a dynamically adaptable management system for automatic apparatus payment data.

To illustrate the invention FIG. 2 shows as an example three interaction diagrams for cases A, B and C. These show what kind of instructions and data, for instance, are transferred between the vending machine 10 proper, wireless terminal 12 and a database 16 on a central server 15. In the example of FIG. 2, AT command language is used in the communication between the vending machine 10 and wireless terminal 12. The command language includes e.g. the following instructions: ADD, READ, REPLACE, REMOVE, and SYNC (for synchronize).

In the first exemplary instance of information exchange depicted in FIG. 2, case A, action is initiated by the vending machine 10. It sends an instruction in the AT command language, AT +dbADD=name,datannnn to the wireless terminal 12 in order to cause payment data in the vending machine 10 to be transferred to a database 13 on the terminal 12. The instruction includes identification information (name) sent by the vending machine and the payment data proper (nnnn). The terminal 12 responds with a message +dbADD:name,ID indicating the code ID (Identification) by which the payment data associated with "name" are stored in the database 13 of the terminal 12. In addition to that message the terminal 12 also sends a message +syncSTATUS=volatile to indicate that it is in offline state. The terminal 12 terminates the connection with an OK message.

In the second exemplary information exchange case B depicted in FIG. 2 the vending machine 10 initiates the data transfer using an instruction in the AT command language, AT +dbREPLACE=ID,datannnn. With this instruction the vending machine 10 wants the terminal 12 to replace data corresponding to ID in the database 13 of the terminal 12 by new data (nnnn). The terminal responds with a message +dbREPLACE:name,ID indicating that the data corresponding to ID in the database 13 has been replaced by new data. In addition to that message the terminal 12 also sends a message +syncSTATUS=volatile to indicate that it is in offline state. The terminal 12 terminates the connection with an OK message.

In the third exemplary information exchange case C depicted in FIG. 2 the vending machine 10 initiates the action using an instruction in the AT command language, AT +dbSYNC. With this instruction the vending machine 10 wants to synchronize the central database 16 on a central server 15 with the data in the local database 13 on the terminal 12. To that end the terminal 12 must first establish a communication connection 18 with the central server 15. Secondly, the data in the local database 13 on the terminal 12 are transferred, via the communication connection established, to the central database 16 on the central server 15. This data transfer is depicted by a dotted line 21 in FIG. 2. When the data in the local database 13 have been transferred to the central database 16, the communication connection 21 is terminated. After that, the terminal 12 sends to the vending machine 10 a message comprising the following parts: +dbSYNC:name1, name2, name3, . . . and +syncSTATUS=synchronized. The first part of the message specifies the names of the data elements that have been transferred to the central database. The second part of the message tells that all data in question have been transferred and the central database 16 is thus synchronized with the data in the local database 13. The terminal terminates the connection with an acknowledgment message OK.

FIG. 3 shows as an example principal parts of a wireless terminal 12 belonging to the device arrangement according to the invention. The terminal 12 independently establishes and maintains the data communication connection 18 so that the vending machine 10 doesn't need to do anything in that respect. The terminal 12 uses an antenna 31 in both transmission and reception. Reference numeral 32 represents those elements that constitute the receiver RX with which the wireless terminal 12 receives messages from a cellular network 14. The receiver RX comprises prior-art means for the signal processing functions imposed on the signals received.

Reference numeral 33 represents those elements that constitute the transmitter TX in the wireless terminal. The transmitter block 33 realizes all the signal processing functions that are to be imposed on the signal transmitted in conjunction with a cellular network 14.

Operation of the wireless terminal 12 is controlled by a control unit 34. It controls the operation of all the main components of the terminal 12. It controls both the reception and transmission functions. Likewise it is used to control both the user interface UI 36 and memory 35. In the device arrangement according to the invention the control unit 34 serves as the controlling element for the local database 13 to be created. Moreover, the control unit 34 monitors the current memory capacity 35 of the terminal 12 and, if necessary, initiates a transfer of payment data from the local database 13 to a central database 16. This frees resources in the local database 13 so that they can be re-utilized by the vending machine 10.

In the device arrangement according to the invention, as specified in this application, the user interface UI 36 is advantageously a fixed V.24 interface. It can be used to establish a communication connection from the wireless terminal 12 to the vending machine 10 proper. The user interface 36 may also comprise some other prior-art arrangement to control the operation of the terminal 12, if necessary.

As regards the invention, an essential part in the terminal 12 is the memory 35 in which the local database 35 according to the invention is created for a vending machine. The memory may be either dynamic or static as regards its technical implementation, however so that data can be both saved to and read from it. As the capacity of the memory 35 is limited to the order of some Mbits, the control unit 34 must always be aware of how much there is unused memory capacity in the memory 35 at any given moment. If, as data have been saved to the memory, the unused capacity of the memory 35 has gone below a predetermined minimum, the control unit 34 shall initiate a transfer of data stored in the memory 35 to a central database 16 proper.

The exemplary vending machine arrangement depicted in FIGS. 1, 2 and 3 serves only to illustrate the operation of the device arrangement according to the invention. The device arrangement according to the invention may naturally be applied to save data measured/produced not only by vending machines according to FIGS. 1 to 3, but also by other kinds of automatic apparatus and machines, to the memory of a terminal and subsequently to a central database.

Above it was described some advantageous embodiments according to the invention. The invention is not limited to the embodiments described above. For example, in the exchange of instructions and information between an automatic apparatus/machine and terminal it is possible to use some other command language than the AT command language. Likewise the interaction of an automatic apparatus and terminal may involve other possible instructions and messages than the commands and messages shown in FIG. 2 as examples. The inventional idea may be applied in numerous ways within the scope defined by the appended claims.

The invention claimed is:

1. A device arrangement for communicating data produced by an automatic apparatus/machine, which device arrangement comprises an automatic apparatus/machine, a wireless terminal of a cellular network, means for interconnecting the automatic apparatus/machine and the cellular terminal for exchanging messages between them, at least one central server connected with the cellular terminal via a cellular network, a control server connected with the central server and cellular terminal, in which device arrangement a memory of the cellular terminal is arranged so as to serve as a local database device for the automatic apparatus/machine, and means for transferring data stored in the memory from the local database via a data communication network to a central database, wherein the automatic apparatus/machine comprises means for transmitting and receiving instructions and messages in the AT command language, wherein the step for transferring data stored in the local database to the central database comprises an instruction in the AT command language sent by the automatic apparatus/machine to the cellular terminal in order to start said transfer of data, establishing a communication connection by means of the cellular terminal to the central database, transferring data stored in the memory of the cellular terminal to the central database, and a message in the AT command language sent after said transfer of data by the terminal to the automatic apparatus/machine, indicating that the data transfer was successful.

2. A device arrangement according to claim 1 wherein the means for interconnecting an automatic apparatus/machine and cellular terminal comprise an interface according to V.24 standard.

3. A device arrangement according to claim 1 wherein the control server comprises means for establishing a communication connection with the cellular terminal and means for controlling and changing the hardware configuration and operation of the cellular terminal.

4. A device arrangement according to claim 1 wherein the automatic apparatus is a vending machine.

5. A device arrangement according to claim 1, wherein the control server transfers software applications to the cellular terminal.

6. A cellular terminal connected with an automatic apparatus/machine, comprising an antenna, reception means, transmission means, a user interface, a memory and a control unit wherein the control unit is arranged so as to use the memory as a local database device for the automatic apparatus/machine connected with the cellular terminal, means for transferring data stored in the memory from the local database via a data communication network to a central database, wherein the step for initiating the data transfer from the cellular terminal to the central database is started when the control unit of the cellular terminal detects that free capacity of the memory serving as the local database has dropped below a predetermined limit.

7. A cellular terminal according to claim 6 which comprises means for transmitting and receiving instructions and messages in the AT command language to/from the automatic apparatus.

8. A cellular terminal according to claim 6, which comprises means for transmitting and receiving instructions and messages in a command language for modems.

9. A cellular terminal according to claim 6, wherein the control server transfers software applications to the cellular terminal.

10. A cellular terminal according to claim 6, wherein the automatic apparatus/machine is a vending machine.

11. A method for communicating data produced by an automatic apparatus/machine to a central database, which method comprises a step for transferring the data produced by the automatic apparatus/machine to a cellular terminal, a step for saving data produced by the automatic apparatus/machine to the memory of the cellular terminal serving as a local database, a step for initiating data transfer from the cellular terminal to the central database when a control unit of the cellular terminal detects that free capacity of the memory serving as a database has dropped below a predetermined limit, and a step for transferring said data from the database on the cellular terminal to said central database.

12. A method according to claim 11 wherein the step for transferring data to the cellular terminal comprises an instruction sent by the automatic apparatus/machine in the AT command language, to which the cellular terminal responds with a second message in the AT command language when said transfer of data has been completed.

13. A method according to claim 11 wherein the step for transferring data stored in the local database to the central database comprises an instruction in the AT command language sent by the automatic apparatus/machine to the cellular terminal in order to start said transfer of data, establishing a communication connection by means of the cellular terminal to the central database, transferring data stored in the memory of the cellular terminal to the central database, and a message in the AT command language sent after said transfer of data by the terminal to the automatic apparatus/machine, indicating that the data transfer was successful.

14. A method according to claim 11 wherein the step for initiating a data transfer from the cellular terminal to the central database is started upon reaching a certain time of the day.

15. A method according to claim 11 wherein the step for initiating a data transfer from the cellular terminal to the central database is started when a certain time has elapsed from the previous data transfer.

16. A method according to claim 11 wherein the step for transferring data to the cellular terminal comprises an instruction sent by the automatic apparatus/machine in a command language for modems, to which the cellular terminal responds with a second message in the command language for modems when said transfer of data has been completed.

* * * * *